July 26, 1932.　　A. D. F. McLEAN　　1,869,071
FOLDING FISH BASKET
Filed May 19, 1930　　2 Sheets-Sheet 1
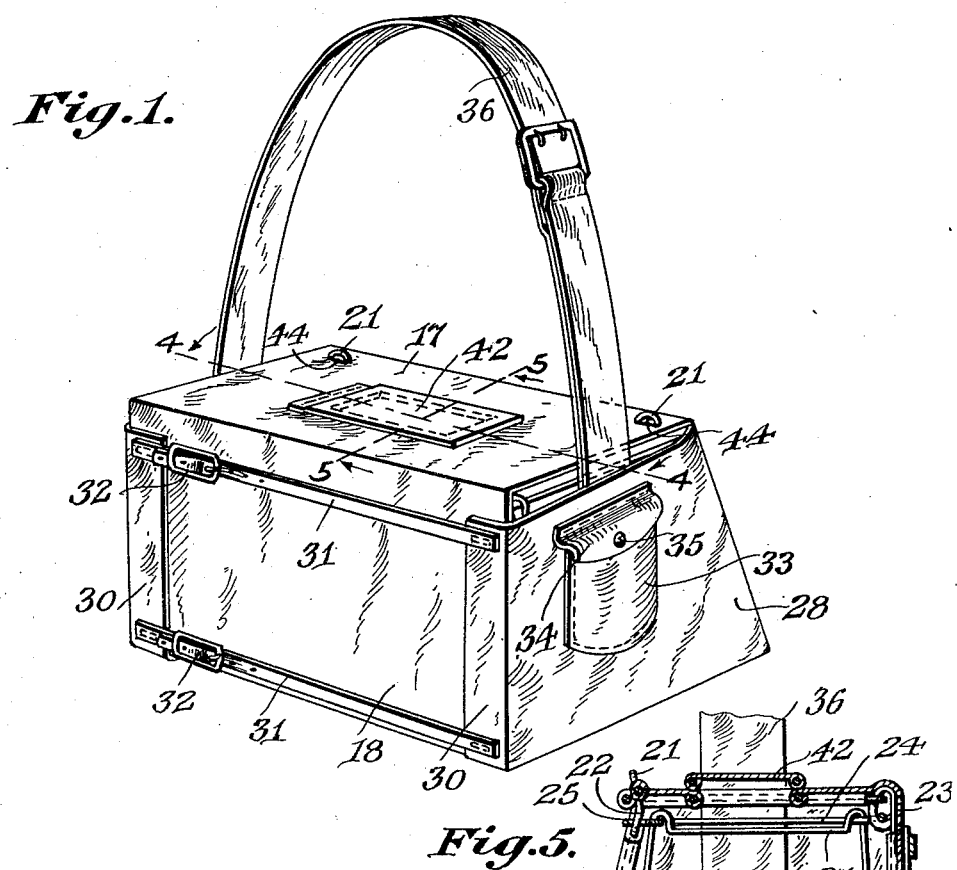
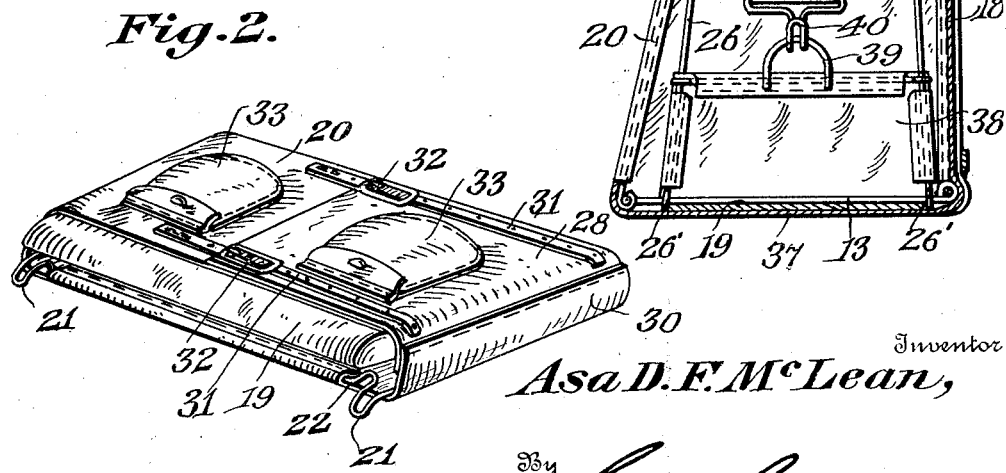

July 26, 1932.  A. D. F. McLEAN  1,869,071
FOLDING FISH BASKET
Filed May 19, 1930  2 Sheets-Sheet 2
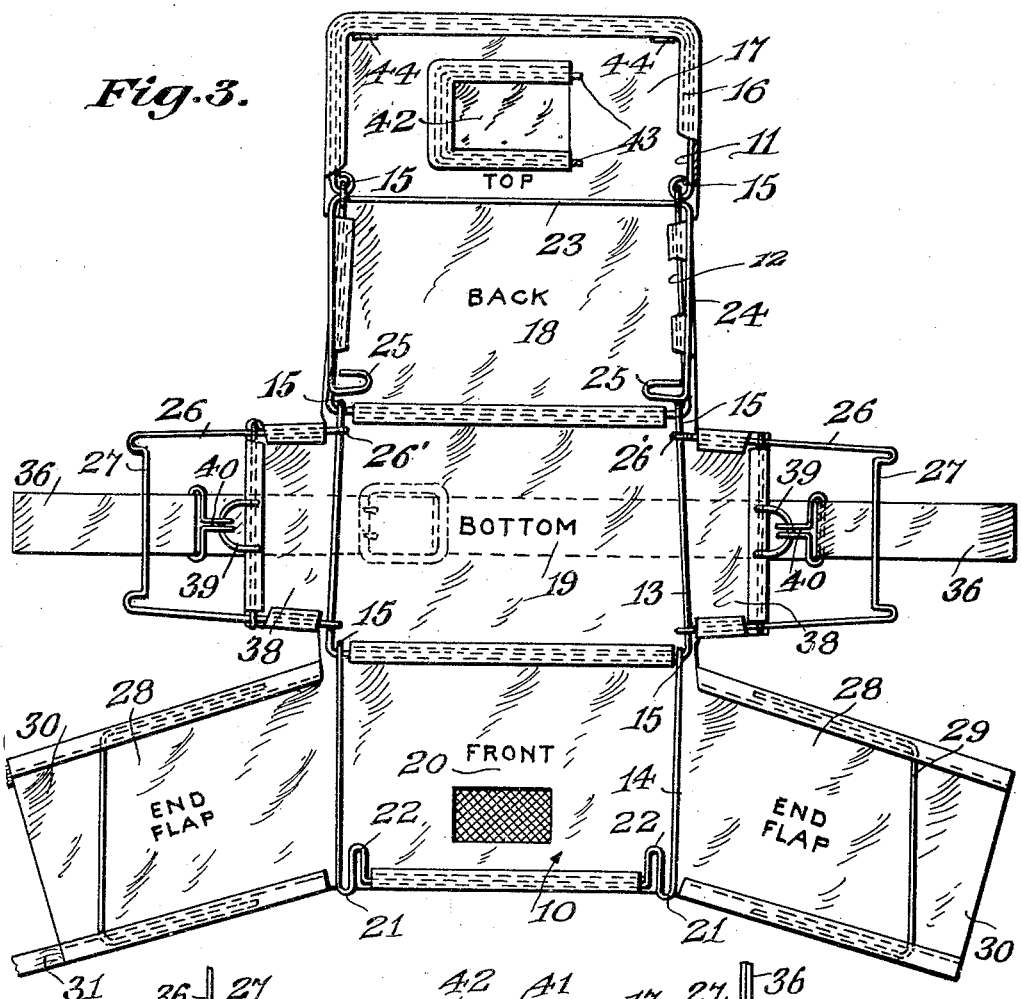
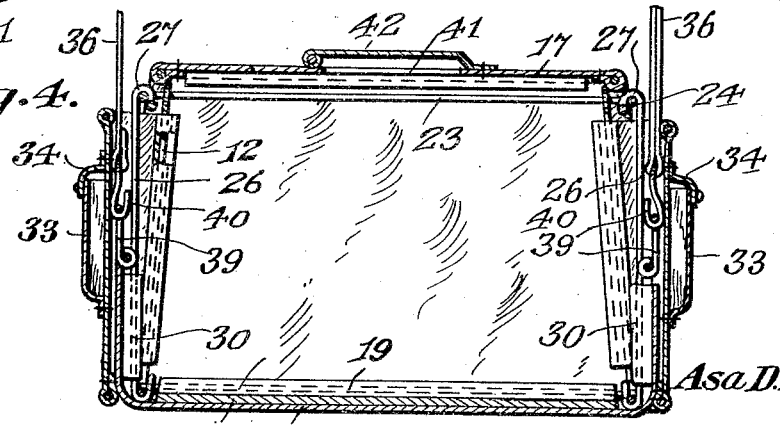

Patented July 26, 1932

1,869,071

UNITED STATES PATENT OFFICE

ASA D. F. McLEAN, OF COWICHE, WASHINGTON

FOLDING FISH BASKET

Application filed May 19, 1930. Serial No. 453,829.

This invention relates to folding fish baskets and has for an object to provide an extremely simple and durable fish basket, preferably formed of a wire framework and a canvas covering, and so formed that it can be folded into compact form so as to occupy but little space when not in use.

A further object of the invention is to provide a simplified means for holding the basket in set-up position, such means requiring only a simple pressure of the fingers to assemble and dis-assemble the same.

A further object of the invention is to provide a strong economical and effective wire frame collapsible basket in which live fish may be placed when caught without liability of their escape and which may be conveniently slung from the shoulder of the fisherman without obstructing movement of the arms in casting.

A still further object is to provide a folding fish basket having exterior pockets for fisherman's equipment and having straps on the end flaps for holding the basket neatly and compactly folded for storing.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification:

Figure 1 is a perspective view of my improved fish basket in set-up position,

Fig. 2 is a perspective view of the fish basket folded,

Fig. 3 is a plan view showing the basket spread out flat preparatory to either being folded or set-up.

Fig. 4 is a longitudinal sectional view on the line 4—4 of Figure 1.

Fig. 5 is a cross sectional view on the line 5—5 of Figure 1.

Referring now to the drawings in which like characters of reference designate similar parts in the various views, and referring more particularly to Fig. 3, it will be seen that the fish basket is preferably formed in a general way from a substantially cruciform blank of canvas 10, the same being reinforced by four substantially U-shaped wire frames 11, 12, 13, and 14 connected to each other by interlocking eyes 15. The marginal edges of the blank of canvas or like material are turned over the frames and there sewed or otherwise secured to the frames, as shown at 16. These frames with their canvas covering form the top 17, back 18, bottom 19, and front 20 of the basket.

For locking the basket in set-up position the longitudinal stretcher of the front reinforcing frame is provided at each end with a pair of reversely disposed loops 21 and 22. A substantially U-shaped wire locking frame 23 has the longitudinal stretcher thereof passed through the hinge eyes of the reinforcing frame of the back of the basket. The legs 24 of the frame terminate in elongated eyes 25. When the basket is to be set-up, as will be presently described, the elongated eyes 25 are forced by the fingers down upon the loops 21 and are received in the loops 22, as shown in Fig. 5, thereby holding the top, back, bottom and front of the basket in set-up position.

To prevent dislodgment of the locking frame from set-up position, a pair of substantially U-shaped wire clamping frames 26 are provided. These frames have hinge eyes 26' which encircle the reinforcing frame 13 of the bottom 19. The free end of each frame 26 is directed inwardly and downwardly to form a hook 27. The hooks 27, as best shown in Figs. 4 and 5, are sprung by the fingers over the side members of the locking frames 24 and positively hold the eyes 25 from dislodgment out of the above described reversely disposed loops 21 and 22.

By again referring to Fig. 3 it will be seen that the lateral portions of the cruciform blank of canvas constitute the end flaps 28 of the basket. These end flaps are reinforced by substantially U-shaped wire frames 29 and the edges of the blank of material are turned over these frames and sewed, as shown, or otherwise securely fastened thereto. The terminals 30 of the end flaps extend beyond the frames 29 to permit of being folded over the back 18, as shown in Fig. 1. Said terminals are also equipped with straps 31 which are provided with buckles 32. These straps hold the end flaps in upright position when the basket is set-up and also provide means for holding the basket strapped in a neat, compact package when folded, as shown in Fig. 2.

The end flaps are also provided with pockets 33, the same being provided with flaps 34 which are held closed by buttons 35. These pockets may be used for conveniently carrying fishermen's equipment.

For the purpose of providing a double bottom for the basket and also for the purpose of securing a shoulder strap 36 to the basket, a blank of canvas 37, as best shown in Figs. 4 and 5, is stitched or otherwise secured to the underneath face of the bottom 19. The terminals 38 of the material extend upwardly along the risers of the frames 26, as shown in Fig. 3. The edges of said terminals are stitched to the frames or otherwise rigidly secured thereto. The free edge of each terminal is equipped intermediate the risers of the corresponding frame with a metal eye 39 which receives a hook 40 carried by the shoulder strap.

For permitting of the insertion of fish when the basket is being carried by the fisherman, an opening 41 is formed in the top of the basket and is normally closed by a canvas cover 42. The cover is reinforced by a substantially U-shaped wire frame 43, as best shown in Fig. 1, and a line of stitching run across one end edge of the cover hingedly secures the cover in place.

By now referring to Fig. 1, it will be seen that formed in the free edge of the top 17 of the basket there is a pair of slots 44 which receive the loops 21, the latter frictionally engaging the frame of the top and serving to hold the top closed when the basket is being worn by the fisherman.

To set-up the basket, assuming the basket is in the flat position shown in Fig. 3, the front 20 is first raised vertically, and then the locking frame 23 is lifted, thereby carrying with it the back 18 and the top 17, and the eyes 25 of the locking frame are engaged in the loops 22. Next, the clamping frames 26 are raised vertically and the hooks 27 thereof are forced down by the fingers to engage over the legs 24 of the locking frame 23. Next, the top 17 is rocked forwardly and the loops 21 are passed into the slots 44. Then the hooks 40 of the shoulder strap 36 are engaged with the eyes 39. Finally, the end flaps 28 are folded back along the frames 26, and the terminals 30 thereof are folded upon the back 18, as shown in Fig. 1, whereupon the buckles 32 are fastened to draw the straps 31 taut. The basket is now ready for use.

In order to fold the basket the buckles are unbuckled and the end flaps are spread apart. The shoulder strap 36 is then unhooked. The top 17 is then raised from the loops 21 and thereupon by pressure of the thumbs and fingers, the clamping frames 26 are disengaged from the locking frame 23 and spread outwardly. The eyes 25 of the locking frame 23 are now lifted from engagement with the loops 22 whereupon the basket may be spread out in flat form, as shown in Fig. 3.

The clamping frames 26 are then folded inwardly toward each other upon the bottom and the locking frame 23 is folded downwardly upon the back. The top is now folded upon the back and both the back and top are then folded down upon the folded clamping frames. Then, the front is folded over upon the folded top. Then the end flaps are folded toward each other and lie along the bottom of the package thus formed. The buckles 32 are then buckled and the basket is in a small neat, compact bundle for storing.

Having thus described the invention, I claim:

1. A folding fish basket having rim frames hingedly connected together and carrying a covering to form the top, back, bottom and front of the basket, a locking frame hinged to the frame of said top and adapted to removably engage the frame of said front, lateral clamping frames hinged to the frame of said bottom and removably engaging said locking frame, end flaps carried by said front and extending over said clamping frames, straps for removably securing the end flaps together, and buckles for said straps, said locking frames being adapted to be folded inwardly upon said bottom, said back and said top being adapted to be folded upon each other with said locking frame therebetween, said folded back, top and locking frame being then adapted to be folded as a unit upon said bottom, said front being adapted to be then folded upon said back, said end flaps being adapted to be then folded upon said bottom, said straps being adapted to be then buckled to confine said basket in a compact bundle for storing.

2. A folding fish basket including a substantially cruciform blank of fabric, a plurality of substantially U-shaped reinforcing wire frames connected to each other by interlocking hinge eyes, the marginal edges of the body of the blank being turned over the frames and sewed, said frames and the said fabric forming the top, back, bottom and front of the basket when folded toward each other in set up position, the longitudinal stretcher of the front reinforcing frame being provided with a pair of reversely disposed loops at each end, a substantially U-shaped wire locking frame having the longitudinal stretcher thereof passed through the hinge eyes of the reinforcing frame of the back of the basket and having the legs thereof terminating in elongated eyes, each of said elongated eyes being adapted to be forced by pressure of the operator's fingers down upon one of the loops of each pair of said reversely disposed loops and being received in the other loop of said pair of loops to hold the basket in set up position, wire clamping frames for preventing dislodgment of the locking frame hinged to the sides of the reinforcing frame of the bottom of the basket and provided with hooks adapted to be sprung by the operator's fingers over the side members of the locking frames, the lateral sides of said cruciform blank of material forming side flaps adapted to be folded over the clamping frames, and straps for securing the ends of the flaps together upon the back of the basket.

In testimony whereof I affix my signature.

ASA D. F. McLEAN. [L. S.]